US 6,698,997 B2

(12) United States Patent
Arne et al.

(10) Patent No.: US 6,698,997 B2
(45) Date of Patent: Mar. 2, 2004

(54) DUMP TRUCK WITH REMOVABLE/ EXTENDABLE CONVEYOR AND SPREADER

(75) Inventors: John R. Arne, DeKalb, IL (US); George M. Bailey, Byron, IL (US)

(73) Assignee: The Louise Berkman Company, Steubenville, OH (US)

( * ) Notice: Subject to any disclaimer, the term of this patent is extended or adjusted under 35 U.S.C. 154(b) by 149 days.

(21) Appl. No.: 10/078,943

(22) Filed: Feb. 19, 2002

(65) Prior Publication Data

US 2003/0156933 A1 Aug. 21, 2003

(51) Int. Cl.[7] ................ B60P 1/04; B60P 1/36
(52) U.S. Cl. ........... 414/502; 414/503; 414/523; 414/528; 239/672
(58) Field of Search ................ 414/489, 502, 414/503, 523, 528; 239/657, 672, 676; 198/312–316.1, 594

(56) References Cited

U.S. PATENT DOCUMENTS

| 1,928,859 A | * | 10/1933 | Kutscha | 414/518 |
|---|---|---|---|---|
| 2,284,853 A | * | 6/1942 | Wall | 414/504 |
| 2,517,151 A | * | 8/1950 | Weston | 414/519 |
| 2,584,069 A | * | 1/1952 | Wall | 414/523 |
| 2,870,923 A |   | 1/1959 | Jewell, Jr. |  |
| 3,090,515 A | * | 5/1963 | Crowther | 414/505 |
| 3,643,785 A | * | 2/1972 | Bostedt | 198/496 |
| 3,790,090 A | * | 2/1974 | Lorenc et al. | 239/666 |
| 4,583,693 A |   | 4/1986 | Harder |  |
| 4,685,619 A |   | 8/1987 | Harder et al. |  |
| 4,886,214 A |   | 12/1989 | Musso, Jr. et al. |  |
| 4,923,359 A | * | 5/1990 | Petri et al. | 414/523 |
| 5,170,947 A |   | 12/1992 | Houle et al. |  |
| 5,190,432 A | * | 3/1993 | Gerow | 414/489 |
| 5,397,172 A |   | 3/1995 | Musso, Jr. et al. |  |
| 5,400,974 A |   | 3/1995 | Musso, Jr. et al. |  |
| 5,466,112 A |   | 11/1995 | Feller |  |
| 5,618,002 A |   | 4/1997 | Cervelli et al. |  |
| 5,772,389 A |   | 6/1998 | Feller |  |
| 6,186,731 B1 |   | 2/2001 | Vickers et al. |  |

* cited by examiner

*Primary Examiner*—Dean J. Kramer
(74) *Attorney, Agent, or Firm*—Fay, Sharpe, Fagan, Minnich & McKee

(57) ABSTRACT

The dump body of a dump truck includes an opening in the bottom of the dump body through which material in the receptacle can be deposited onto an endless conveyor below the dump body. A spreader is removably mounted on the conveyor whereby material moved by the conveyor onto the spreader is discharged rearwardly of the dump truck. The conveyor and spreader unit can be extended and retracted relative to the dump body and can be completely removed from the dump body and the opening in the bottom of the dump body covered when using the dump truck in a dumping mode of operation.

59 Claims, 15 Drawing Sheets

DUMP TRUCK WITH REMOVABLE/ EXTENDABLE CONVEYOR AND SPREADER

BACKGROUND OF THE INVENTION

The present invention relates to the art of trucks and, more particularly, to improvements in dump trucks of the type including an integrated conveyor and spreader system for conveying material from a dump body to a spreader while facilitating the hauling of long items, conveying material through a tailgate opening, or the hauling/dumping of material without interference from auxiliary structures carried by the truck for use in conjunction with the integrated conveyor and spreader system.

Trucks, such as dump trucks, have been used heretofore to convey material such as salt, sand, dirt, gravel, and the like for the purposes of transporting the materials from one location to another and/or spreading such materials onto road surfaces to improve the road surface and/or traction of vehicles traveling thereon. Dump trucks have also been used to carry and dispense asphalt on road surfaces for repair and maintenance purposes and to transport elongated components such as steel rods, wood beams, and the like. Materials of a granular nature are commonly dispensed from the truck by tilting the dump body so that the materials flow therefrom by gravity and/or by conveying the materials within the dump body out through an opening in the floor of the dump body or through an opening in the tailgate thereof. Dump trucks with such integrated conveyor systems are shown, for example, in U.S. Pat. No. 4,886,214 to Musso, et al.; U.S. Pat. No. 5,397,172 to Musso, et al.; and U.S. Pat. No. 6,186,731 to Vickers, et al. In this respect, these patents disclose a dump truck in which the dump body or material receptacle is provided with an endless conveyor for conveying materials in the dump body to an adjustable feedgate mounted within an opening in the tailgate of the dump body for selective positioning relative to the conveyor to control the dispensing of materials from the dump body.

Other patents disclosing dump trucks and conveyor combinations are: U.S. Pat. No. 4,685,619 to Harder; U.S. Pat. No. 2,870,923 to Jewell; U.S. Pat. No. 5,170,947 to Houle; U.S. Pat. No. 4,583,693 to Harder; U.S. Pat. No. 5,400,974 to Musso; U.S. Pat. No. 5,466,112 to Feller; and U.S. Pat. No. 5,772,389 to Feller. The Houle patent discloses a particulate spreader with a dump truck that has a bed that can be tilted and a conveyor that has an end extending forwardly of the front wall of the dump body. The Jewell patent discloses a convertible dump body where the conveyor can be covered by plates which provide inclined side walls in the truck bed when the conveyor is uncovered. U.S. Pat. No. 5,772,389 to Feller and the patents to Harder disclose tilting truck beds and conveyors that dump material onto a spreader that spreads the contents. The Feller patent further discloses covering the conveyor when the latter is not in use. The other patents referred to are representative of further prior art regarding dump truck and conveyor combinations. The aforementioned patents are incorporated herein by reference to provide background information with respect to the type of vehicles and conveyor arrangements to which the improvements according to the present invention are applicable.

The prior art devices in the above patents are conveyors and/or spreaders which are permanently and/or fixedly attached to the truck chassis and remain attached even when the dump truck is used for dumping materials. The conveyor and spreader apparatus is not protected from exposure to adverse weather when not being used for spreading, and is not protected from other damage attendant to having the conveyor and spreader arrangement permanently attached to the vehicle. Additionally, if the dump truck is used for dumping gravel or stone materials, the position of the conveyor and/or spreader apparatus relative to the tailgate does not preclude abrasive contact of the material being dumped with the component parts of the conveyor/spreader apparatus. All of these problems result in increased maintenance time and cost in connection with repairing damage to component parts or replacing the parts. Consequently, there remains a need for a conveyor and spreader assembly to be used with a dump truck which overcomes the aforementioned problems and limitations.

SUMMARY OF THE INVENTION

In accordance with the present invention, a conveyor and spreader assembly is provided by which the foregoing and other disadvantages and problems with conveyor and spreader assemblies heretofore available are minimized or overcome. More particularly in accordance with one aspect of the invention, a conveyor and spreader assembly is removably mounted on a dump body whereby, during periods of non-use of the conveyor and spreader assembly, the latter can be easily removed so as to provide for use of the dump truck for other purposes without interference from or potential damage to the conveyor and spreader components. More particularly in this respect, the dump truck can be used for hauling a variety of materials which can be dumped when the tailgate is released for pivotal movement to an open position and, with the conveyor and spreader removed, such dumping is achieved without any potential interference from or damage to the component parts of the conveyor and spreader. Moreover, the tailgate can be pivoted relative to the truck bed about a horizontal axis adjacent the lower end of the tailgate, by which the latter can be opened to a flat condition coplanar with the bottom of the truck body. In this manner, the tailgate provides an extension for the hauling of elongated objects such as trees, lumber, pipes, and the like.

In accordance with another aspect of the invention, the conveyor and spreader components can be extended and retracted relative to the rear end of the truck, whereby the dump truck can be temporarily configured to be used as a typical dump truck as described above when the conveyor and spreader assembly is retracted. When the conveyor and spreader is extended outwardly of the rear end of the dump body, material in the dump body can be moved rearward by the conveyor and onto the spreader for discharge rearwardly of the dump truck.

The ability to remove the conveyor and spreader assembly from a truck and to extend and retract the assembly relative to the truck when it is mounted thereon advantageously promotes versatility with respect to use of the truck and versatility of the use of the conveyor and spreader assembly when the latter is on the truck. Mounting and removal of the conveyor and spreader assembly from the dump truck is simple and easy to achieve so as to minimize the time and effort required to mount and remove the assembly. It will be appreciated that when the conveyor and spreader components are not in use and are removed from the dump truck and suitably stored, they are protected from exposure to adverse weather and/or other potential damage attendant to having conveyor and spreader components permanently attached to the vehicle.

It is accordingly an outstanding object of the present invention to provide improvements in connection with conveyor and integrated spreader mechanisms in dump trucks selectively used for hauling and discharging materials from the rear end of the dump body, either by elevating the dump bed or through the use of a conveyor/spreader mechanism.

A further object is the provision of a conveyor and spreader mechanism which allows the dump body of a truck to function in an improved manner as a typical dump truck or in conjunction with the conveying and spreading of particulate material.

Yet another object is the provision of a conveyor and spreader mechanism which can be readily mounted and removed from a dump body of a dump truck and which, when mounted, can be extended and retracted relative to the rear end of the truck.

Still a further object is the provision of an improved conveyor and spreader mechanism which, in combination with a dump body, optimizes the material hauling capabilities of the dump body.

Yet a further object is the provision of an improved conveyor and spreader mechanism which avoids the maintenance and/or replacement costs heretofore encountered as a result of the conveyor and/or spreader being permanently mounted on a dump truck and thus being on the truck during periods of non-use of the conveyor and/or spreader mechanism.

Still another object is the provision of an improved conveyor and spreader mechanism which optimizes protection of the conveyor and spreader components from damage and/or interference with materials being hauled and/or dumped by the truck during periods of non-use of the conveyor and spreader mechanism.

BRIEF DESCRIPTION OF THE DRAWINGS

The foregoing and other objects and advantages will in part be obvious and in part pointed out in the following description taken together with the accompanying drawings in which.

DESCRIPTION OF PREFERRED EMBODIMENTS

Figure 1:
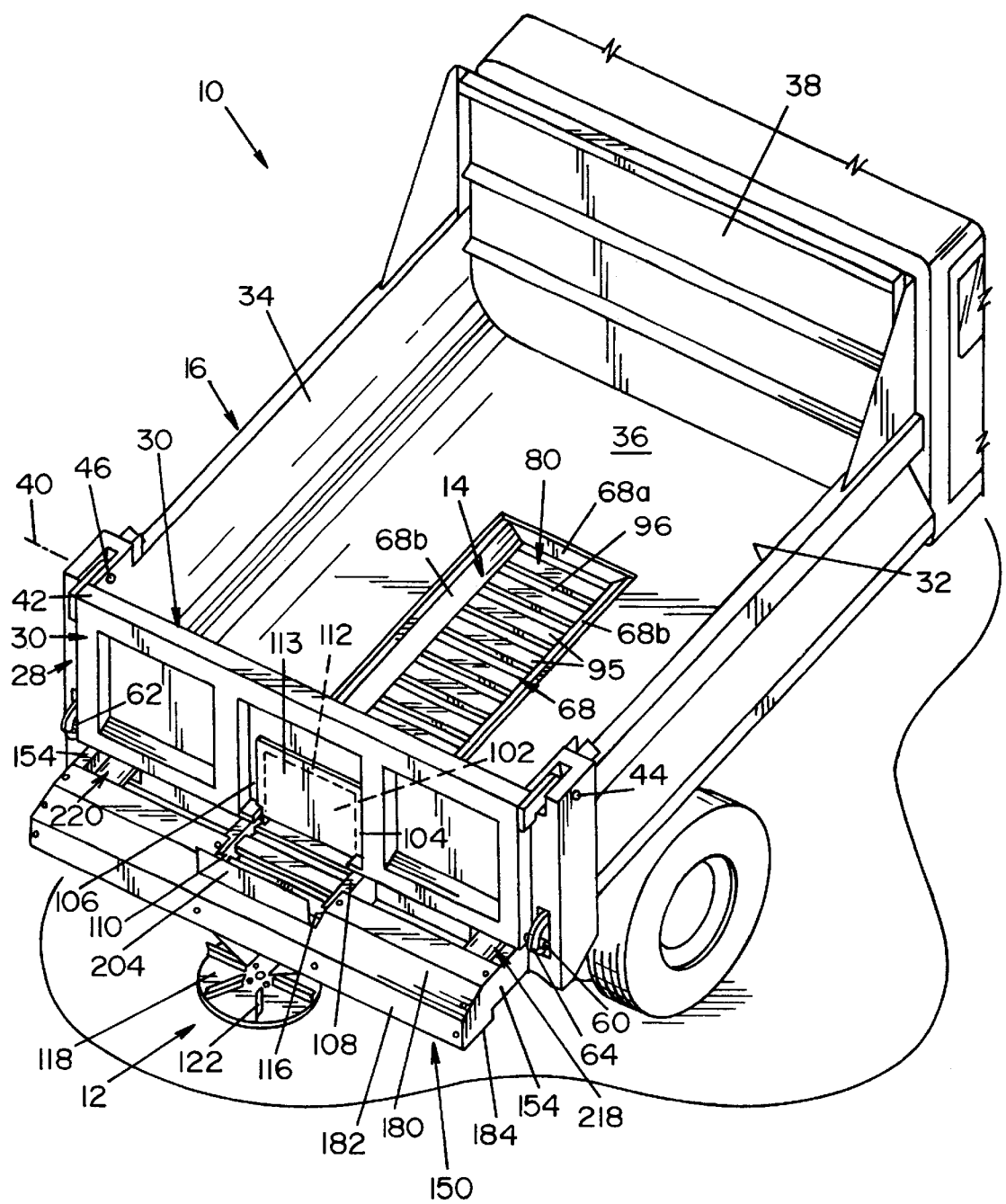
FIG. 1 is a perspective view of the rear portion of a dump truck which includes a dump body, conveyor, and spreader arrangement in accordance with the present invention.

Referring now in greater detail to the drawings, wherein the showings are for the purpose of illustrating preferred embodiments of the invention only, and not for limiting the invention, a dump truck 10 is illustrated which includes a conveyor and spreader assembly according to the present invention and which assembly comprises a spreader unit 12 integrated with a conveyor 14. In a well known manner, the rear portion of dump truck 10 includes a material receptacle or dump body 16 mounted on the truck frame 18 as described hereinafter for pivotal displacement about a rear axis 20 between a normal or horizontal position shown, for example, in FIG. 8, and an inclined position, shown in FIG. 10, respectively, for hauling and dumping material from dump body 16. Raising and lowering of dump body 16 is achieved by a suitable hydraulic lift unit 22 connected between truck frame 18 and dump body 16 as more fully described hereinafter. Dump body 16 is pivotally mounted on frame 18 by a pair of pivot pins 24 and 25 and corresponding pairs of support members 26 and 27 respectively on dump body 16 and truck frame 18. Dump body 16 includes a rear end 28, a tailgate 30, opposite side walls 32 and 34, bottom 36 and a front end wall 38. It will be appreciated that the portions of bottom 36 adjacent sides 32 and 34 are sloped downwardly and inwardly to facilitate the directing of material in dump body 16 toward the center thereof.

As shown in FIGS. 1–4, tailgate 30 is in a closed position and is pivotally mounted on dump body 16 by a pair of pivot pins 44 and 46 between the dump body and tailgate for pivotal movement about a horizontal axis 40 proximate the upper end 42 of the tailgate. Tailgate 30 is maintained in its closed position by pins 60 and 62 on the tailgate which respectively releasably engage with latch bars 64 and 66 attached to dump body 16. An opening 68 is provided in bottom 36 of dump body 16 centrally between walls 32 and 34 and has a downwardly extending front wall 68a rearward of front wall 38 and downwardly and inwardly extending side walls 68b extending longitudinally from front wall 68a to the rear edge 70 of bottom 36. As will be appreciated from FIG. 1, opening 68 allows particulate material inside dump body 16 to be deposited onto conveyor 14. Opening 68 is adapted to be covered in the manner and for the purpose set forth hereinafter.

As seen in FIGS. 1–5, conveyor 14 extends longitudinally below bottom 36 of dump body 16, centrally between side sills 74 of truck frame 18, and has a front end 14a adjacent front wall 38 of body 16 and a rear or discharge end 14b rearwardly of tailgate 30. Conveyor 14 is supported below bottom 36 and comprises an endless belt 80 trained about pairs of front and rear sprockets 82 and 84, respectively, and which sprockets are respectively associated with front and rear sprocket shafts 86 and 88. Shafts 86 and 88 extend between conveyor support channels 87 and are rotatably supported thereon by corresponding bearing blocks 89. Belt 80 comprises a pair of sprocket chains 94, each trained about sprockets 82 and 84 on a corresponding side of the conveyor, and a plurality of slats 95 extending between and are suitably attached to chains 94 for movement therewith. Slats 95 are longitudinally spaced apart, and the conveyor further includes a planar conveyor plate 96 underlying the upper run of belt 80 and welded or otherwise secured between channels 87 together with cross support members 98. In the embodiment illustrated, rear sprocket shaft 88 is driven by a suitable motor 100 to drive belt 80 and, as will become apparent hereinafter, particulate material in dump body 16 drops into the spaces between slats 95 and is moved along plate 96 toward rear end 14b of the conveyor when belt 80 is so driven.

As best seen in FIGS. 2, 4, 5, and 9, conveyor 14 is supported beneath bottom 36 of dump body 16 for longitudinal sliding displacement relative thereto. In the embodiment illustrated, this support is achieved by a generally U-shaped support member 101 having a horizontally disposed support plate portion 103 which extends longitudinally underneath lower flanges 87a of support channels 87. Support 101 further includes upwardly and outwardly angled side portions 105 which are welded or otherwise secured to the underside of bottom 36 of dump body 16. Upper flanges 87b of the support channels slidably engage side walls 68b of opening 68 and assist in maintaining a straight orientation of the conveyor underneath dump body 16. Support member 101 advantageously protects the underside of conveyor 14 from road debris and other materials which may bounce up underneath dump truck 10.

Tailgate 30 has an opening 102 therethrough defined by vertical sides 104 and 106 laterally outwardly adjacent a corresponding one of the sides 108 and 110 of conveyor 14, and a top edge 112 between sides 104 and 106 and spaced above conveyor 14. A removable cover 113 closes opening 102 when the truck is not being used to spread particulate material. Accordingly, it will be appreciated that when dump body 16 contains material, such as salt, and the truck is to be used for spreading the salt, cover 113 is removed or raised and conveyor 14 is driven for the upper run thereof to move toward rear end 28, whereby material is discharged from conveyor 14 through tailgate opening 102.

Figure 2:
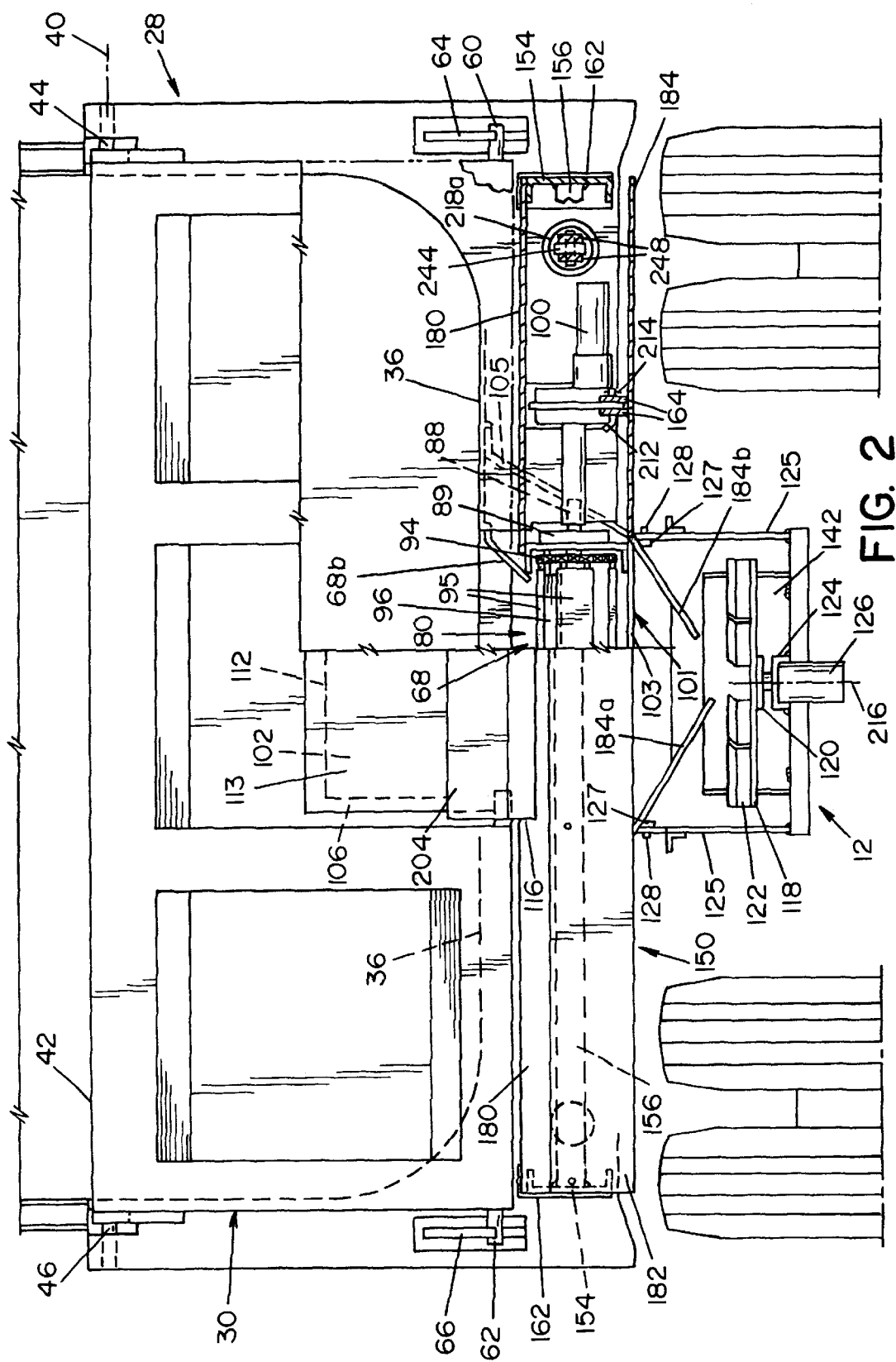
FIG. 2 is an enlarged rear elevation view, partially in section, of the tailgate, conveyor, conveyor drive motor, and spreader.
Figure 3:
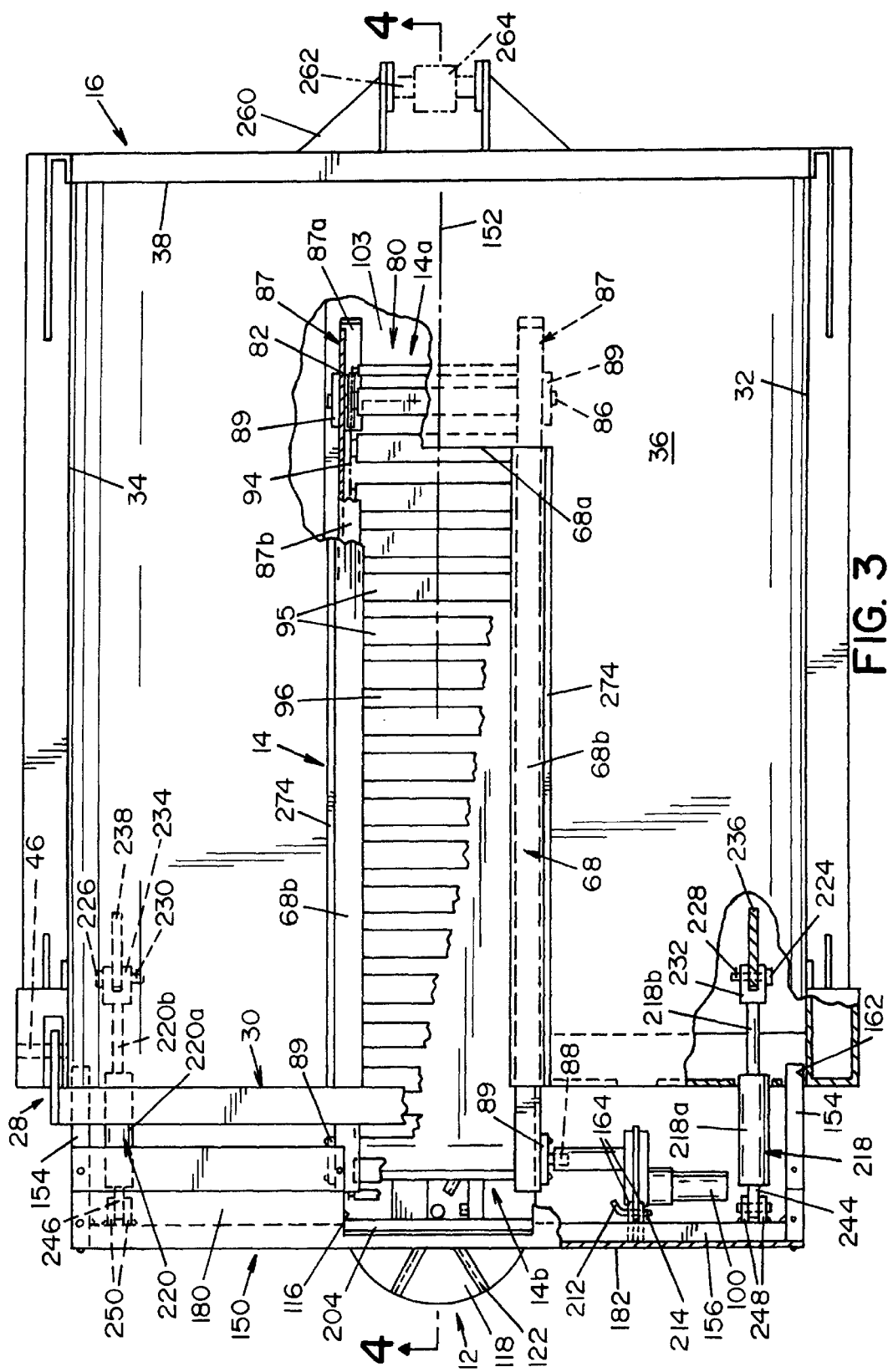
FIG. 3 is a plan view, partially in section, of the conveyor and spreader mechanism in the extended position thereof.
Figure 4:
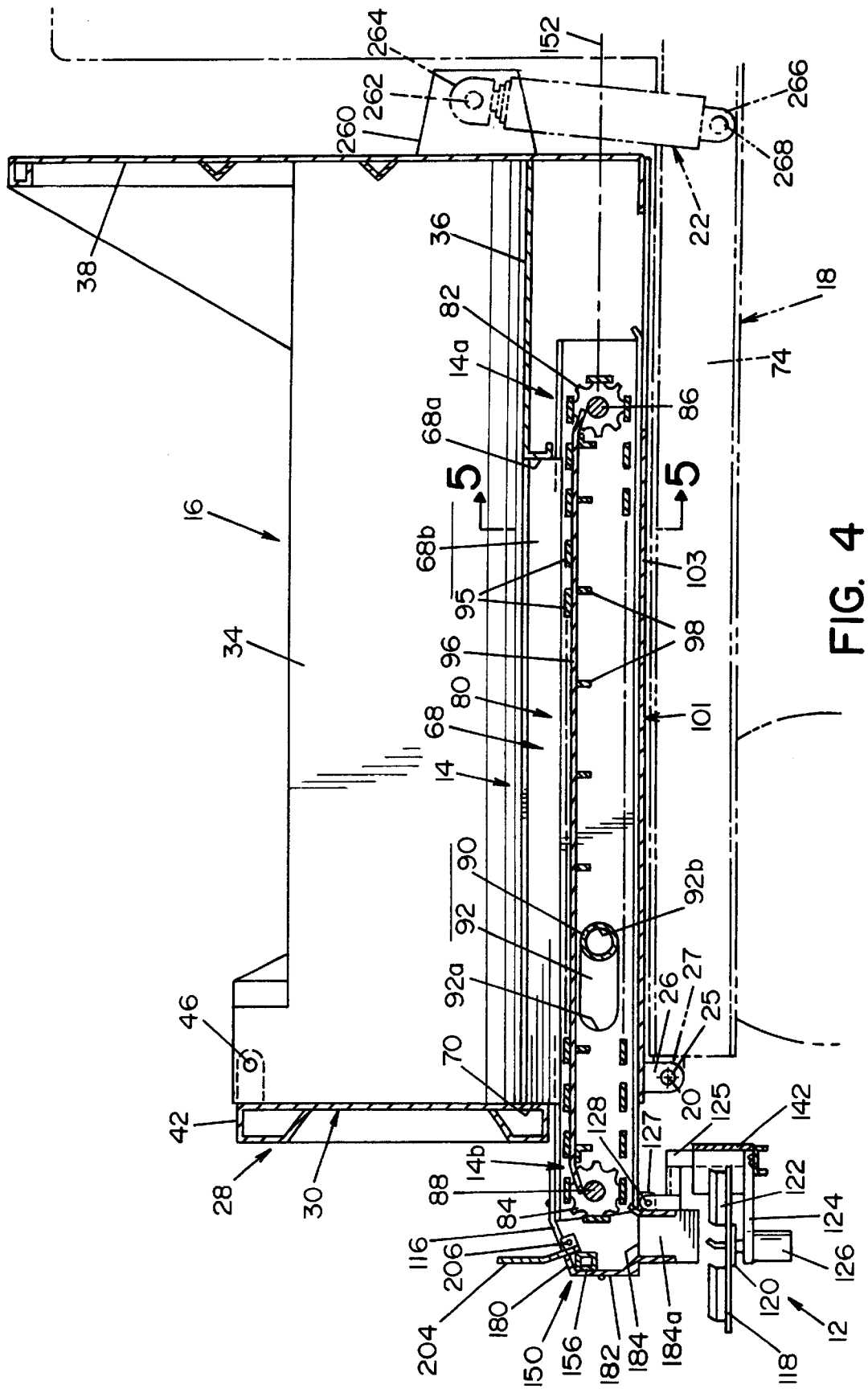
FIG. 4 is a sectional elevation view looking in the direction of line 4—4 in FIG. 3.

In accordance with one aspect of the present invention, as best seen in FIGS. 2–4, conveyor 14 is integrated with spreader unit 12 to provide an arrangement for moving particulate material rearwardly of dump body 16 onto the spreader and then from the spreader onto the ground. Spreader unit 12 may take a variety of structural forms and in the illustrated embodiment, has an axis 216 and includes a centrally apertured circular spreader plate 118, a center hub 120 mounted therebeneath, and several evenly spaced, radially-extending vanes 122 on the upper side of plate 118. A spreader mounting plate 124 supports drive motor 126 for spreader plate 118 and is pivotally and removably connected to the underside of conveyor 14 by Z-shaped mounting straps 125 having upper ends removably interconnected with mounting members 127 on the conveyor by pivot pins 128. Spreader 12 further includes a back shield 142 for deflecting particulate material rearwardly and avoiding discharge of material toward side sills 74 of truck frame 18.

Figure 6:
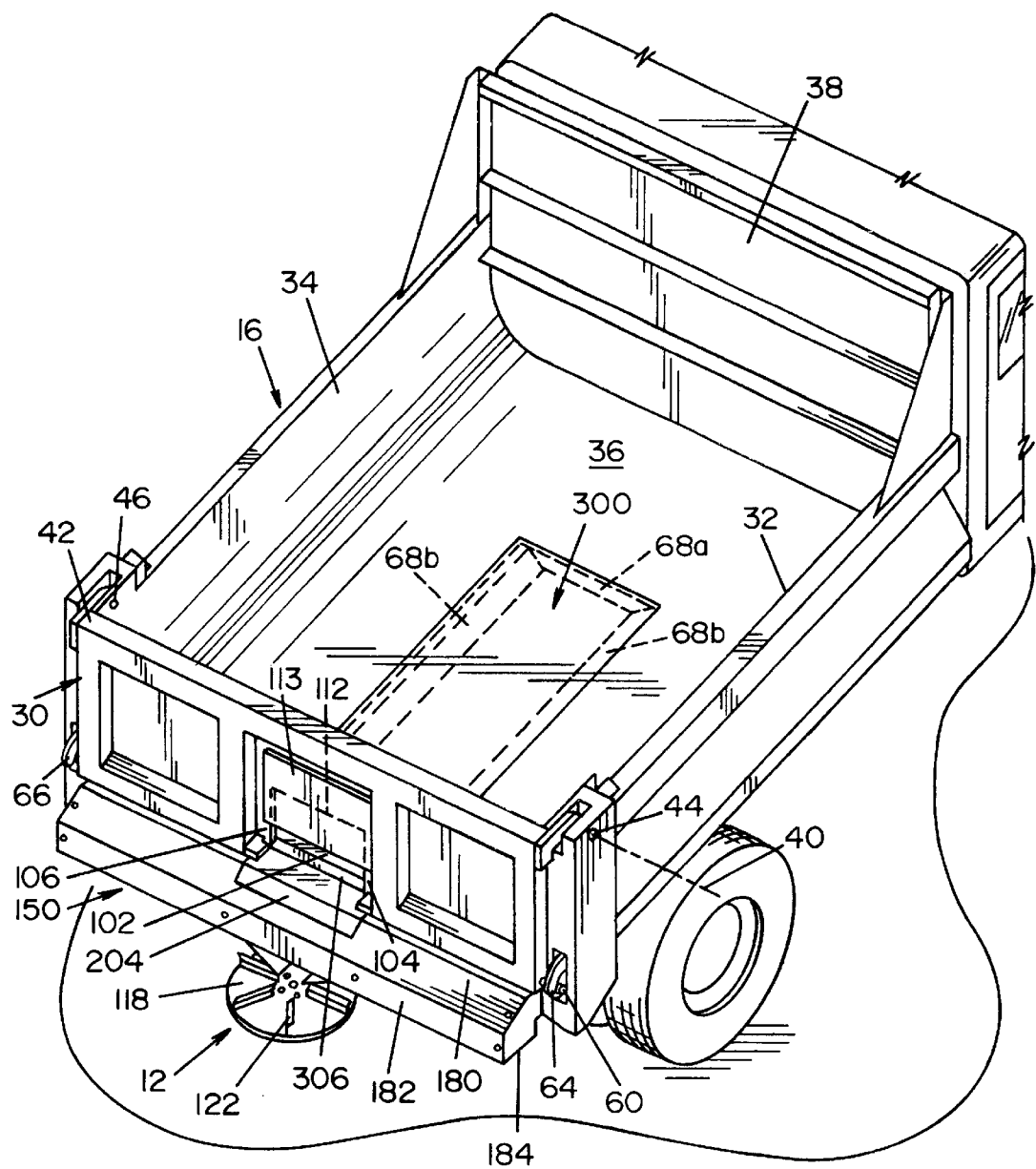
FIG. 6 is a perspective view of the rear portion of the dump truck with the removable floor plate inserted into the dump body and the conveyor and spreader mechanism in the retracted position.
Figure 7:
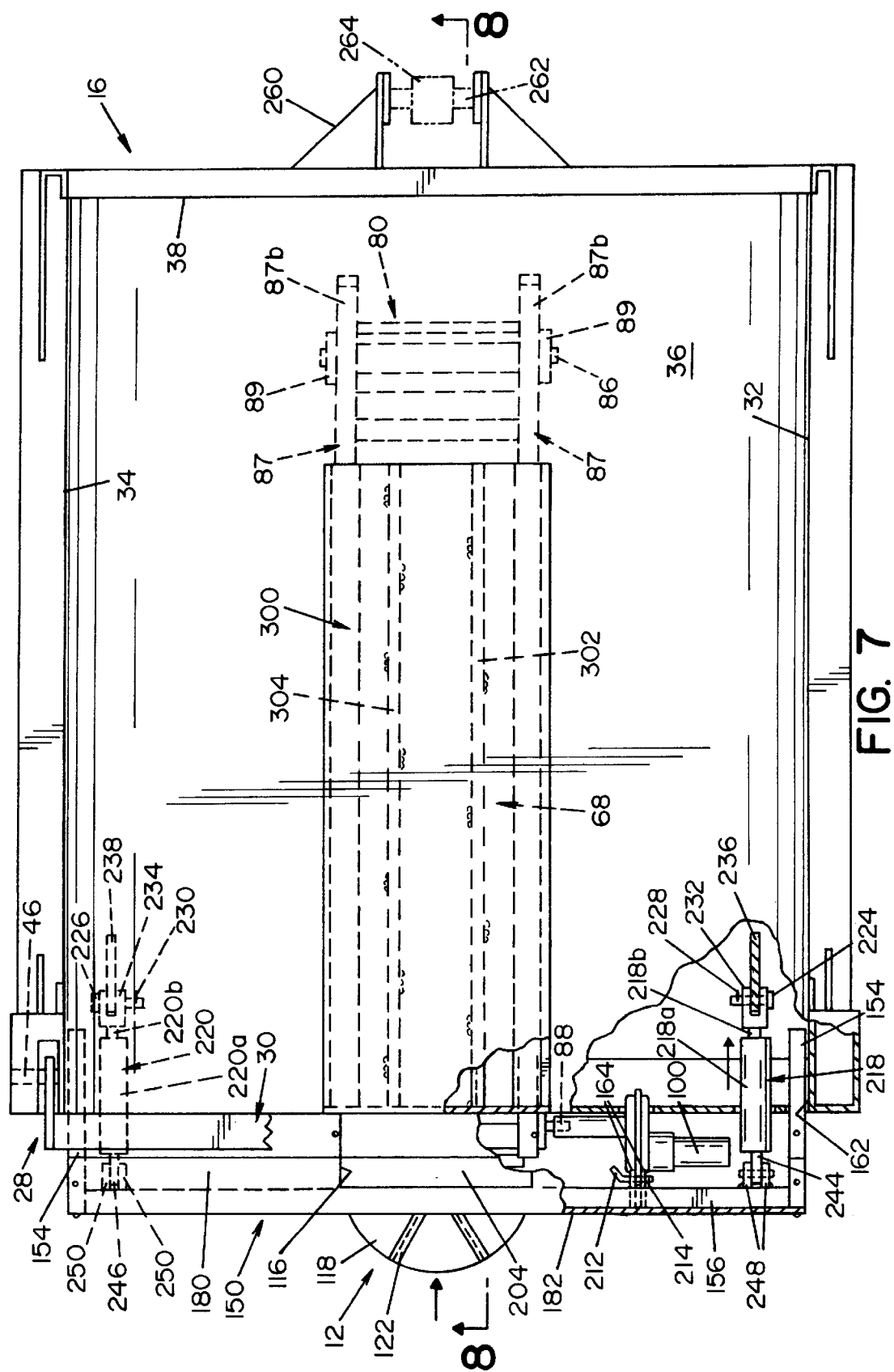
FIG. 7 is a plan view, partially in section, of the conveyor and spreader mechanism in the retracted position and the removable floor plate inserted in the dump body.
Figure 8:
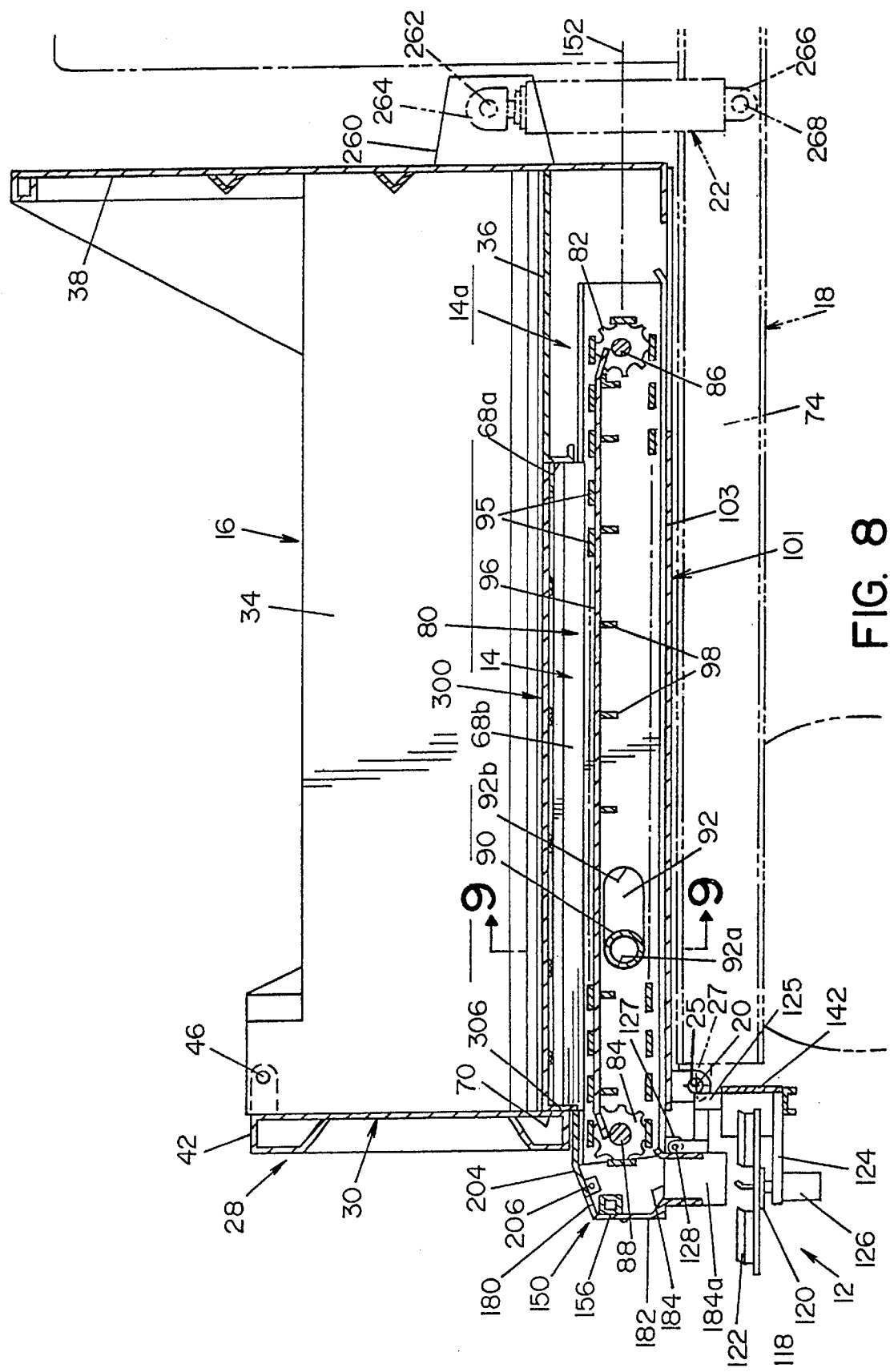
FIG. 8 is a sectional elevation view looking in the direction of line 8—8 in FIG. 7.

As will be appreciated from the description of conveyor 14 hereinabove, the conveyor 14 and spreader 12 are supported for displacement longitudinally of dump body 16 along axis 152 from a retracted position as shown in FIGS. 6–8 to an extended position as shown in FIGS. 1, 3, and 4. As will be appreciated from FIGS. 4, 8, 9, and 11, the displacement of the conveyor and spreader in the directions of extension and retraction is limited by a pin and slot arrangement including a slot 92 in each support rail 87 and a tubular pin 90 which extends through slots 92 and is mounted between angled side portions 105 of support 101. More particularly in this respect, angled side portions 105 are provided with circular openings 105a for receiving the ends of tubular pin 90, and the ends of the pin are provided with openings 90a for receiving a corresponding L-shaped pin 158 and retaining clip 160. When conveyor 14 is in the retracted position, the rear end 92a of slot 92 engages with pin 90, and when the conveyor is in the extended position, the front end 92b of slot 92 engages the pin. Thus, it will be appreciated that rear end 92a and front end 92b of slot 92 provide stops to respectively limit movement of conveyor 14 inwardly and outwardly of dump body 16.

The conveyor and spreader assembly includes a rear deck 150 which extends laterally of rear end 14b of the conveyor and rearwardly of dump body 16. Rear deck 150 partially underlies tailgate 30 in the retracted position of the conveyor and spreader assembly, and is spaced rearwardly of the tailgate in the extended position of the assembly. As best seen in FIGS. 1–4 and 11, the rear deck includes a frame comprised of laterally spaced apart channel members 154 and a tubular cross member 156 therebetween and secured thereto such as by welding. Cross member 156 is spaced rearwardly from end 14b of the conveyor, and deck 150 further includes a top wall 180 overlying and suitably secured to a rearward portion of each of the channel members 154, a rear wall 182 extending downwardly behind cross member 156 and the rear ends of channel members 154, and a bottom wall 184 extending forwardly under the rear ends of channels 154. Bottom wall 184 includes inclined portions 184a and 184b extending laterally inwardly over the spreader plate for directing the discharge of material from conveyor 14 onto the spreader. Top wall 180 includes an access opening 116 which overlies end 14b of the conveyor and a cover 204 for closing the opening. Cover 204 is hingedly connected to top wall 180 by pivot pins 206. The opening is closed by cover 204 when the conveyor and spreader assembly are in the retracted position, and cover 204 can be opened when conveyor 14 and spreader 12 are in the extended position to provide access to end 14b of the conveyor and to optimize the discharge of material from the conveyor onto the spreader. The forward ends of channel members 154 slide into corresponding openings 162 in dump body 16 to stabilize the deck and conveyor and to maintain the deck and conveyor in the desired orientation relative to dump body 16. As shown in FIGS. 2 and 3, drive motor 100 for conveyor 14 is detachably supported on walls 182 and 184 of deck 150 by mounting members 164 on the walls and corresponding pins 212 and retaining spring clips 214.

Figure 11:
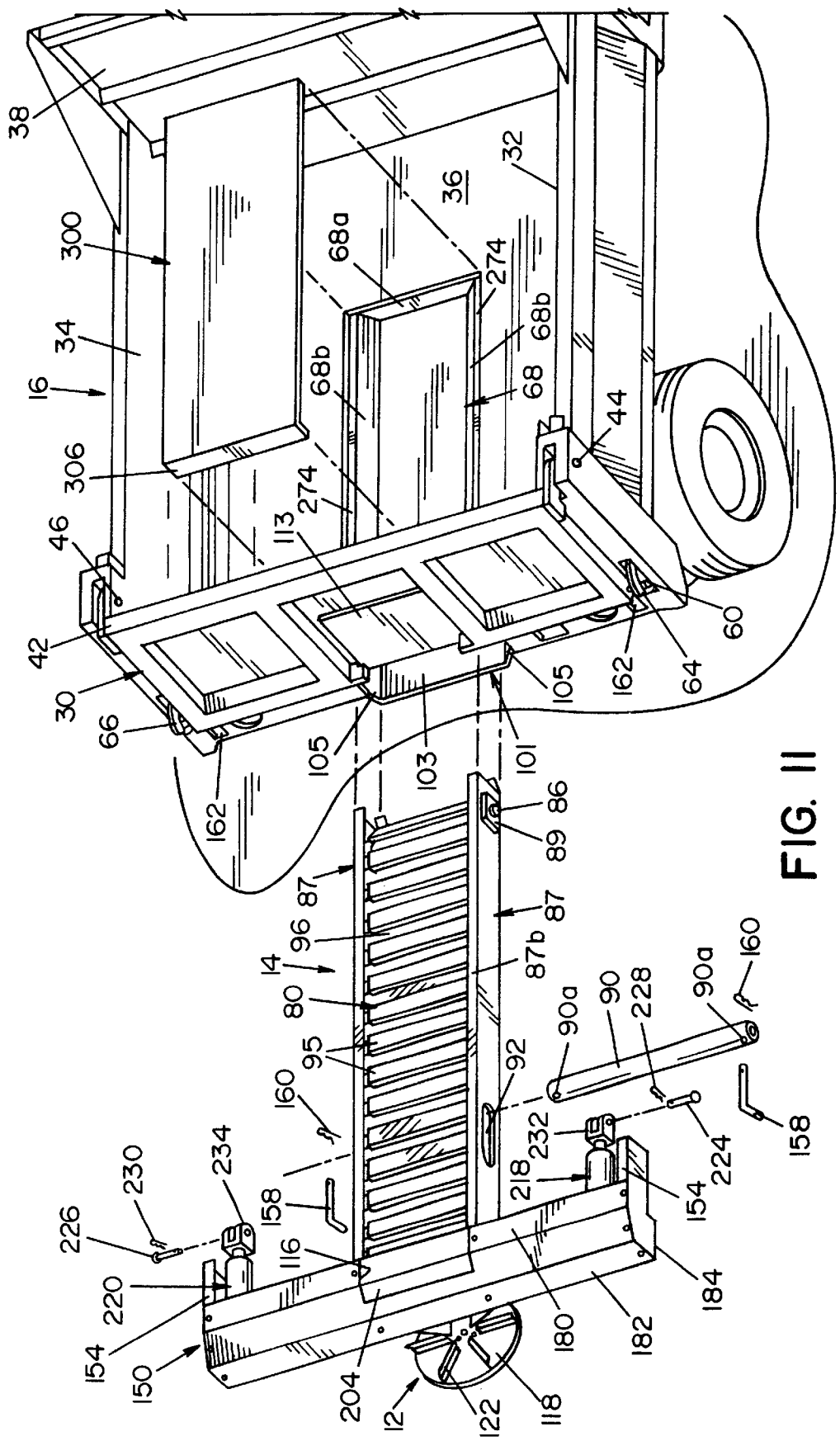
FIG. 11 is an exploded, perspective view of the rear portion of the dump truck showing the conveyor and spreader unit removed from the dump truck.

As shown in FIG. 3, deck 150 and thus the conveyor and spreader assembly is displaceable between the retracted and extended positions thereof relative to dump body 16 by two hydraulic piston and cylinder units 218 and 220. As will become apparent hereinafter, the piston and cylinder units also removably retain the deck and the conveyor and spreader assembly in its mounted relationship with the dump body. As best seen in FIGS. 3 and 11, cylinder and piston units 218 and 220 respectively include a cylinder component 218a and 220a and a corresponding piston rod 218b and 220b. The outer ends of the piston rods are respectively connected to mounting plates 236 and 238 on dump body 16 by pins 224 and 226 which go through corresponding devises 232 and 234 on the outer ends of piston rods 218b and 220b. Pins 224 and 226 are removably secured by retaining clips 228 and 230. The outer ends of cylinders 218a and 220a are respectively connected to rear deck 150 by stems 244 and 246 on the cylinders which are received between pairs of flanges 248 and 250 attached to cross member 156. The flanges and stems are interconnected by pins, not designated numerically. Hydraulic piston and cylinder units 218 and 220 provide forces for retracting and extending conveyor 14 and spreader unit 12 relative to dump body 16. In accordance with the invention, the conveyor and spreader assembly is adapted to be completely removed from the truck. This is achieved by first removing retaining clips 160 and retaining pins 158 to release tubular pin 90 for removal. Then, retaining clips 228 and 230 and pins 224 and 226 are removed to release devises 232 and 234 from plates 236 and 238. Then, as will be appreciated from FIG. 11, deck 150, conveyor 14 and spreader unit 12 may be pulled from the rear end of dump body 16 and completely removed from dump truck 10. This configuration would be desirable when, for example, the truck is to be used for long periods of time to haul and/or dump materials without spreading.

Figure 10:
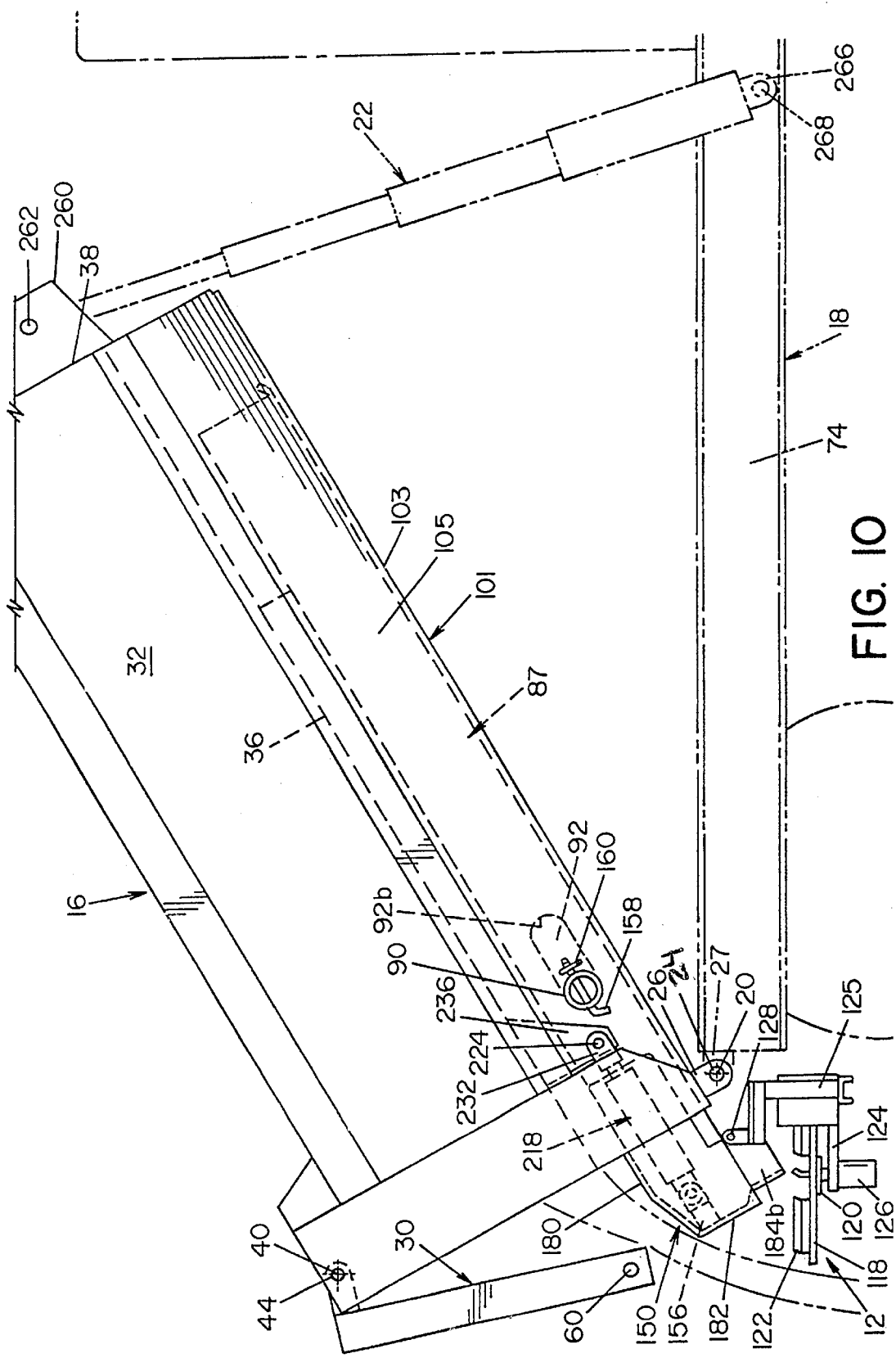
FIG. 10 is a side elevation view of the conveyor and spreader mechanism with the dump body in the raised position thereof.

As shown in FIGS. 4, 7, and 10, hydraulic lift unit 22 has an upper end 264 pivotally connected to a bracket 260 on front end 38 of dump body 16 by a pivot pin or rod 262. The lower end 266 of the lift unit is connected to truck frame 18 by pivot rod 268. Lift unit 22 operates in a well known manner to lift the front of dump body 16, as shown in FIG. 10, when dump truck 10 is used in the dumping mode.

Figure 5:
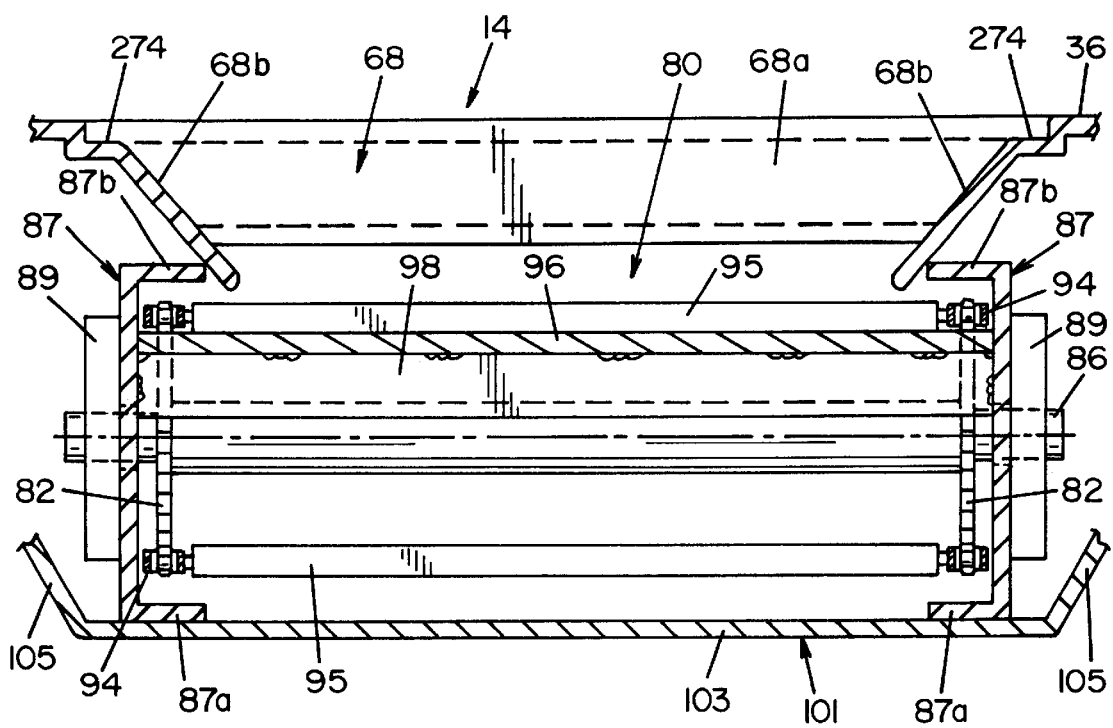
FIG. 5 is an enlarged cross-sectional elevation view looking in the direction of line 5—5 in FIG. 4.
Figure 9:
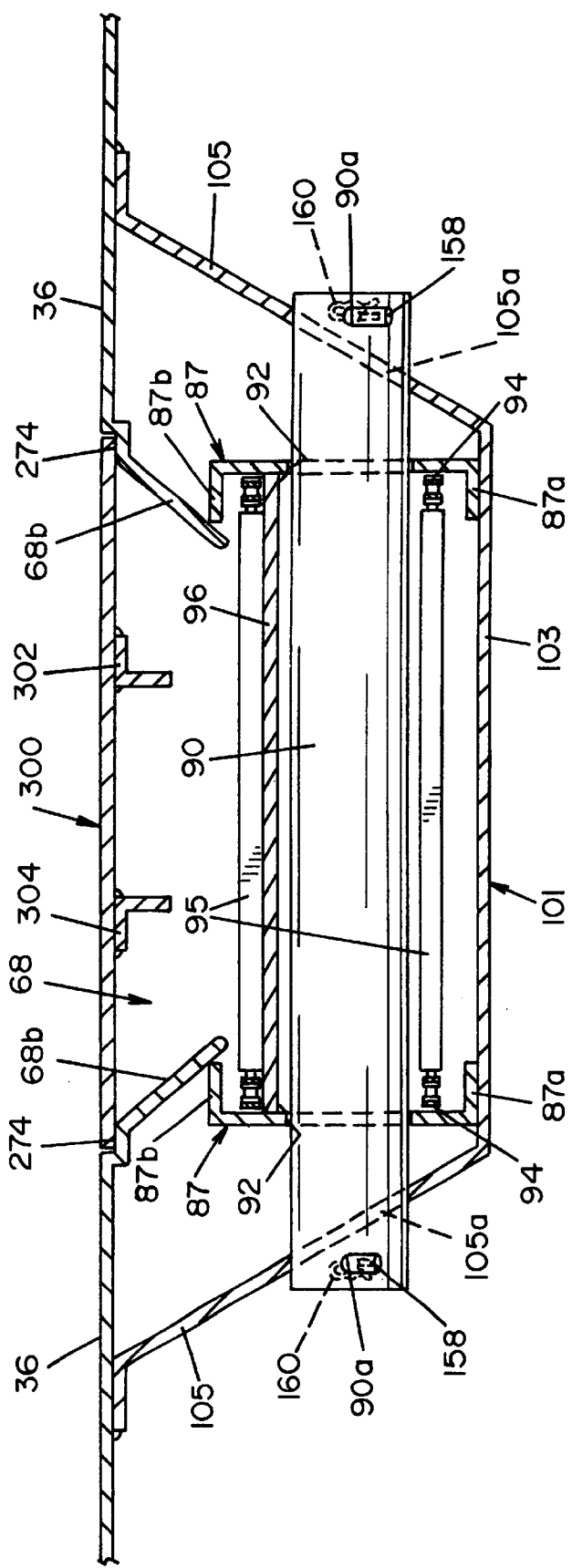
FIG. 9 is an enlarged cross-sectional elevation view looking in the direction of line 9—9 in FIG. 8.
Figure 12:
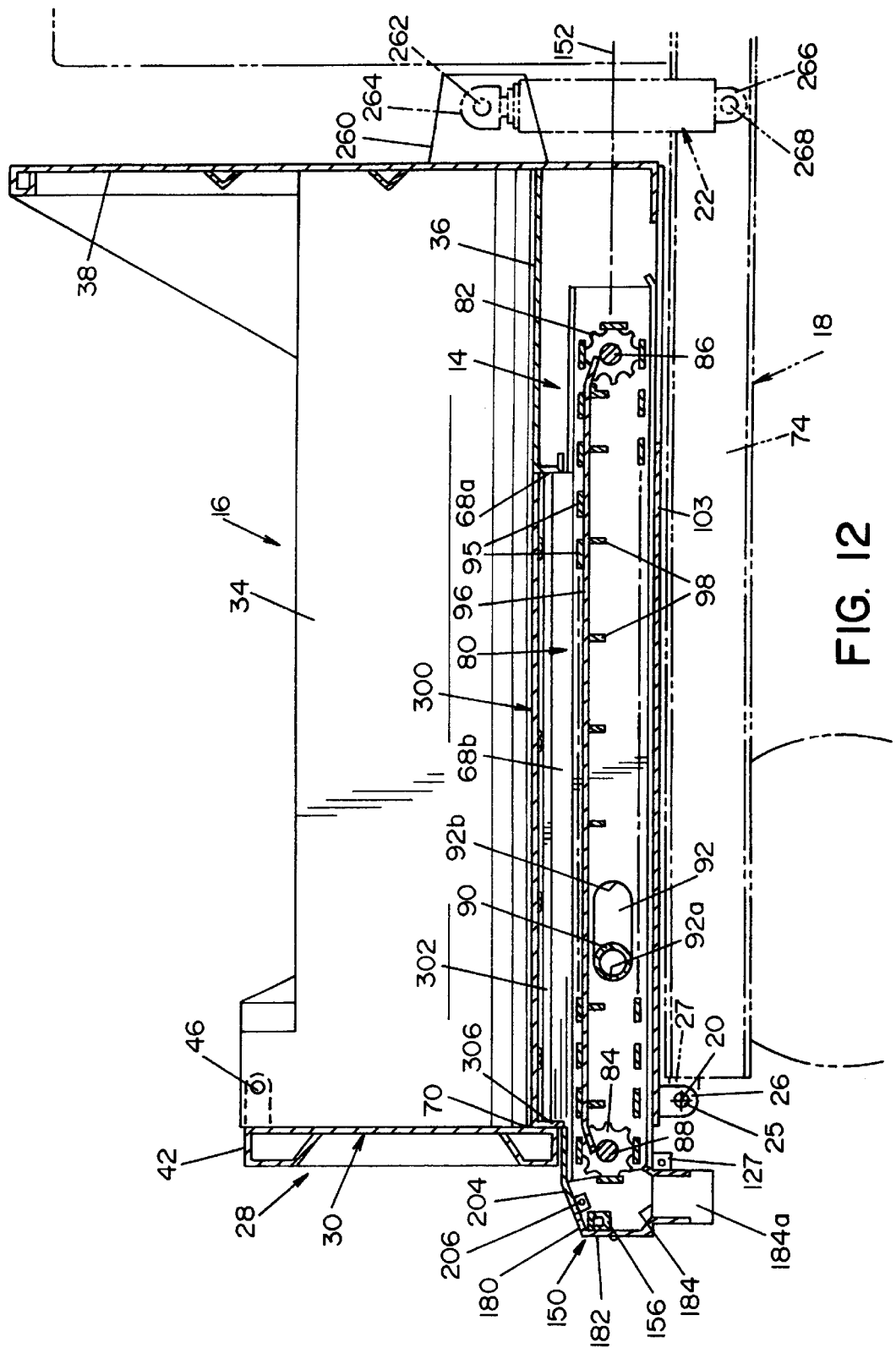
FIG. 12 is a sectional elevation view of the conveyor in the retracted position with the spreader removed therefrom.

As shown in FIGS. 5 and 6, each of the side walls 68b of opening 68 in bottom 36 of dump body 16 is connected to bottom 36 by a horizontal shelf 274. Shelves 274 form supporting surfaces along the sides of opening 68 for supporting a removable panel 300 which closes opening 68 when the truck is used for hauling and/or dumping. As shown in FIGS. 7, 8, and 9, panel 300 includes a rear flange 306 which extends at a right angle downward from the panel adjacent rear edge 70 of bottom 36 when the panel is in place to close opening 68. Preferably, panel 300 is strengthened by two longitudinally extending L-shaped members 302 and 304 which are welded or otherwise secured to the underside of the panel. Members 302 and 304 extend the entire length of panel 300. When panel 300 is inserted in opening 68 and the conveyor and spreader assembly is in the retracted position, as shown in FIG. 10, dump truck 10 can operate in the dumping mode. Thus, when front end 38 of dump body 16 is raised by lift unit 22 to the position shown in FIG. 10, gravity moves particulate material therein to the rear of dump body 16 where the material is discharged underneath tailgate 30 which pivots outward on axis 40 in response to tilting of the dump body. Spreader 12 pivots about pins 128 to remain in a horizontal orientation and avoid interfering with dump body 16, and the particulate material cascades over rear deck 150 and outwardly and over spreader unit 12 thereunder. When dump truck 10 is used for hauling and dumping, panel 300, cover 204, and rear deck 150, together with retraction of the conveyor and spreader assembly, protects the conveyor and spreader assembly from the particulate material being hauled and dumped. In conjunction with such use of the truck, it may be desirable to remove spreader 12 from conveyor 14, as shown in FIG. 12. With panel 300 removed, as shown in FIGS. 1–5, and the conveyor and spreader assembly in the extended position, dump truck 10 is prepared for the conveyor and spreader mode of operation.

Figure 13:
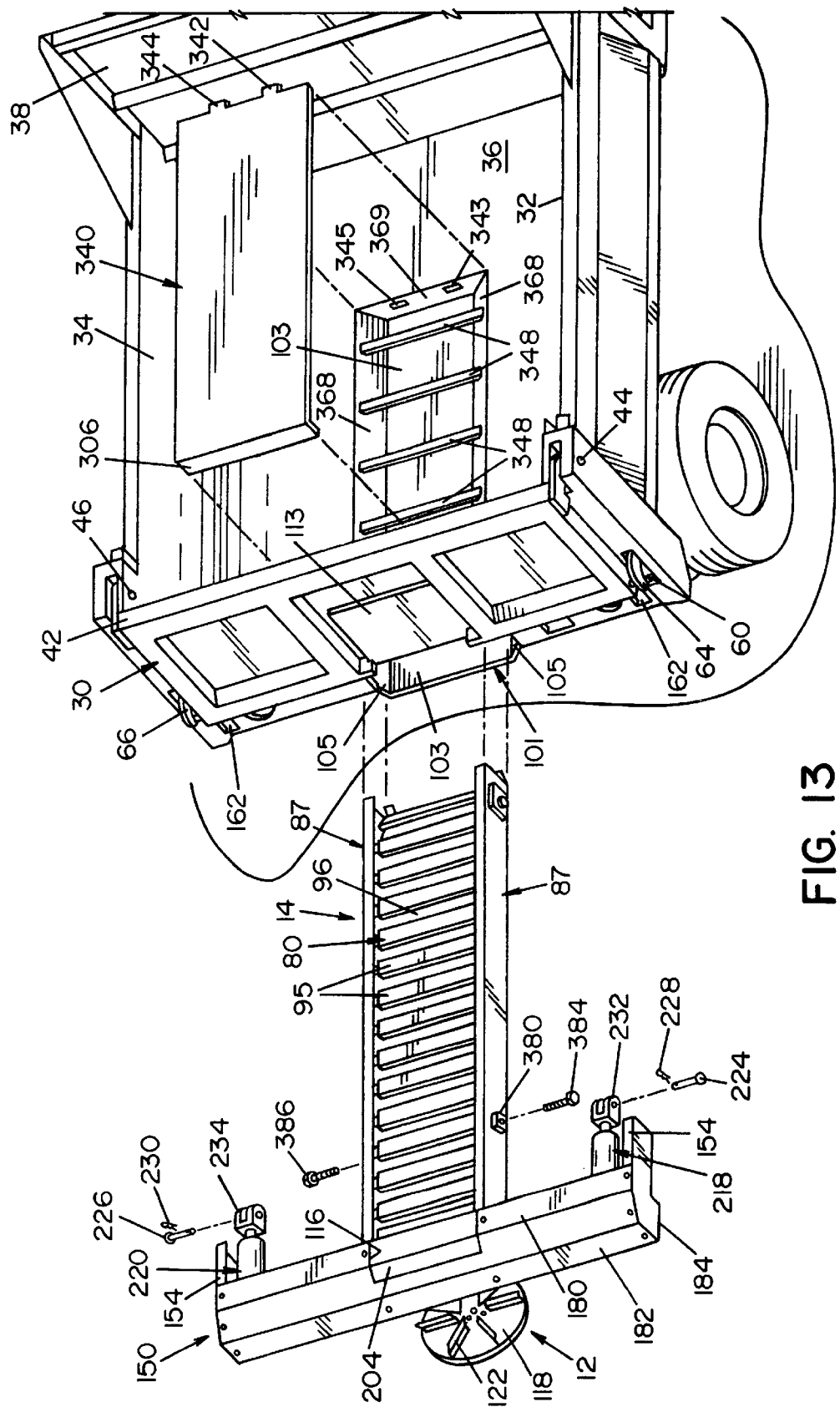
FIG. 13 is an exploded perspective view similar to FIG. 11 and showing modifications of the bottom of the dump body and the arrangement for supporting the conveyor unit for limiting displacement relative to and removal from the dump body.
Figure 14:
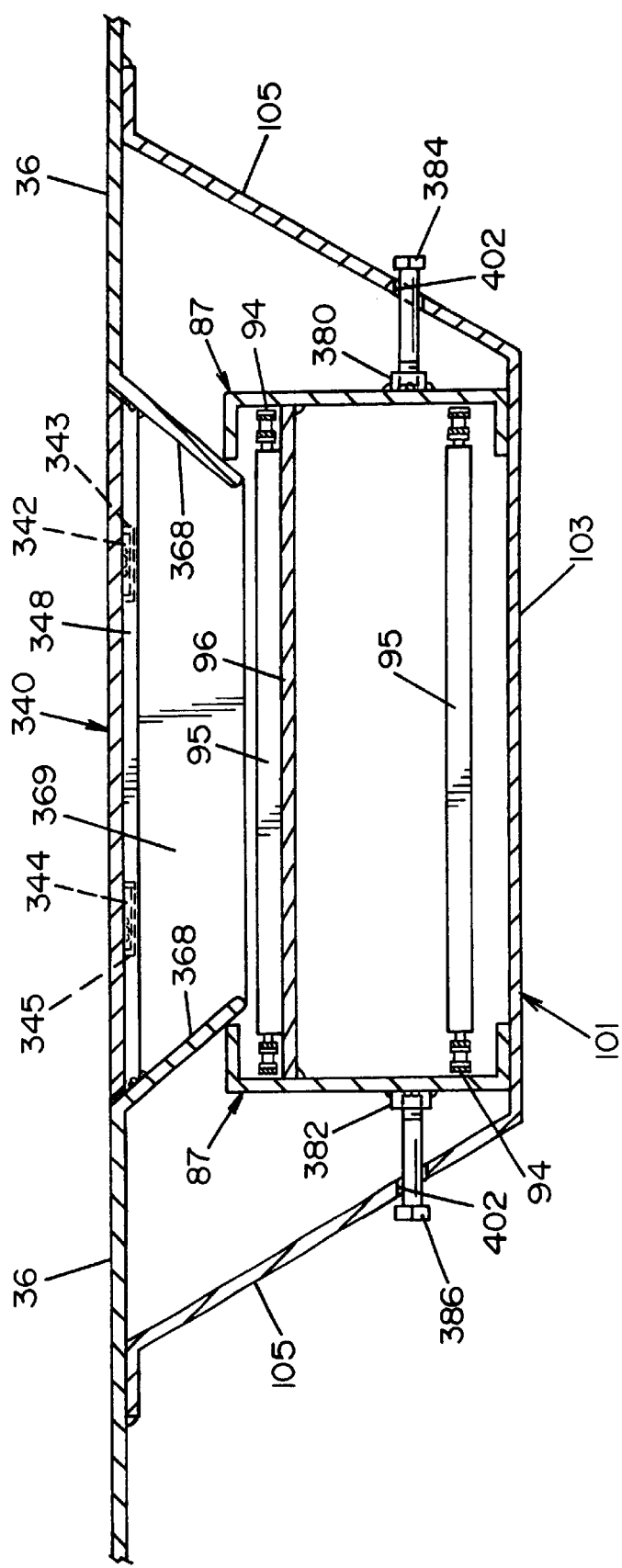
FIG. 14 is an enlarged cross-sectional elevation view similar to FIG. 9 and showing the structural components of the modifications shown in FIG. 13; and, FIG. 15 is a detailed side elevation view of the structure shown in FIGS. 13 and 14 and looking from right to left in FIG. 14.
Figure 15:
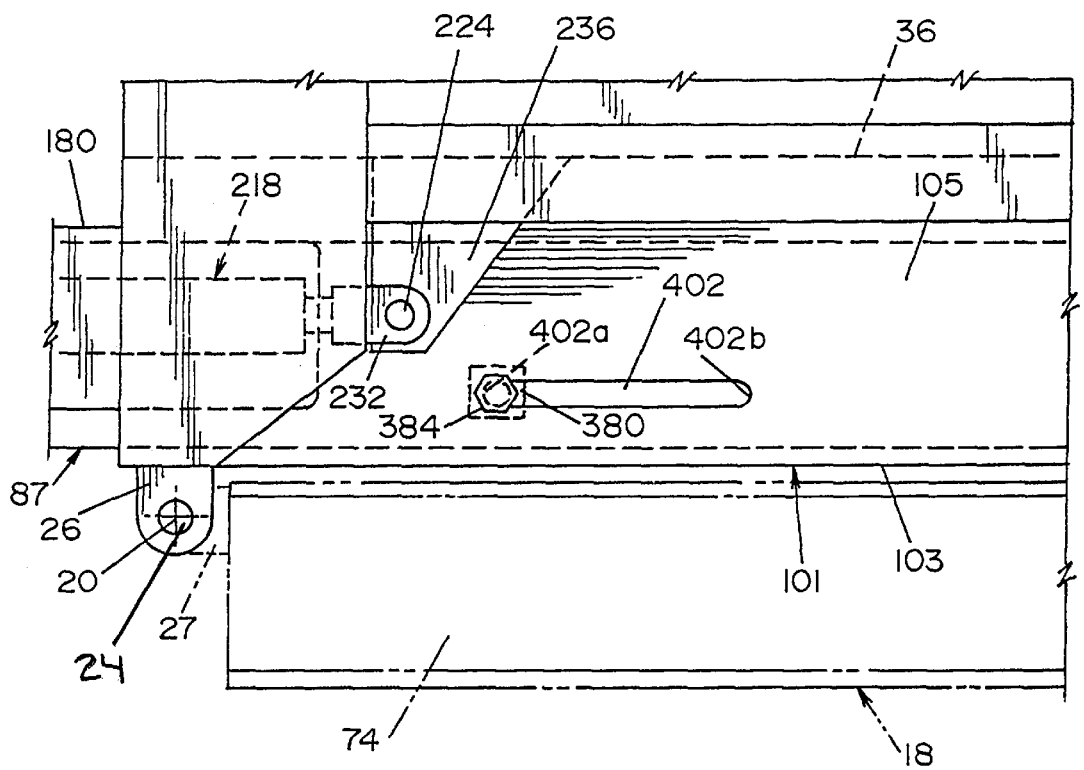

FIGS. 13–15 illustrate modifications of the opening in the bottom 36 of truck body 16, the cover panel therefor and the arrangement for removably mounting the conveyor unit on the truck body and limiting the displacement thereof in the directions of extension and retraction. As will be appreciated from FIG. 13, a cover panel 340 rests upon a series of horizontal bars 348 extending between and welded to side walls 368 which extend downwardly and inwardly from bottom 36 without the ledges as provided in the earlier embodiment. Panel 340 includes two extensions or tabs 342 and 344 at the forward edge thereof which are received in corresponding slots 343 and 345, respectively, provided along an upper edge of front wall 369 of the opening. The bars 348 and the slot and tab arrangement advantageously support panel 340 against bouncing and bars 348 also provide structural support to side walls 368 of the opening.

FIGS. 13–15 illustrate an alternative embodiment for removably supporting the conveyor and spreader unit on the truck body and for limiting displacement thereof in the directions of extension and retraction. More particularly in this respect, the displacement of the conveyor and spreader in the directions of extension and retraction is limited by a bolt and slot arrangement including a slot 402 in each angled side portions 105 of conveyor support member 101 and a pair of pins in the form of bolts 384 and 386 which extend through slots 402 and are removably mounted in nuts 380 and 382, respectively, which are welded or otherwise secured to conveyor support channels 87. When conveyor 14 is in the retracted position shown in FIG. 15, the rear ends 402a of slots 402 engage with bolts 384 and 386, and when the conveyor is in the extended position, the front ends 402b of slots 402 engage the corresponding bolt. Thus, it will be appreciated that rear end 402a and front end 402b of slot 402 provide stops to respectively limit movement of conveyor 14 inwardly and outwardly of dump body 16. When it is desired to remove the conveyor and spreader unit from the truck body, bolts 382 and 384 are unscrewed from the corresponding nut and withdrawn through the corresponding slot, thus freeing the conveyor for removal in the manner explained hereinabove in connection with the earlier embodiment and following removal of pin 90 from the conveyor and support member. It will likewise be appreciated that removable pin arrangements other than that provided by bolts and nuts can be devised to provide the function of the latter.

While considerable emphasis has been placed herein on the preferred embodiment of the invention, it will be appreciated that other embodiments can be made and that many changes can be made on the preferred embodiment without departing from the principals of the invention. In this respect, for example, it will be appreciated that the tailgate can also be hingedly connected to the truck about a horizontal axis adjacent the lower end of the tailgate, so that the tailgate can be opened to a flat condition coplanar with the bottom of the dump body. In this manner, the tailgate is horizontally aligned with bottom 36 and provides an extension thereof enabling the hauling of objects longer than the bottom. Likewise, as a further example, extension and retraction of the conveyor and spreader assembly can be achieved manually rather than through the use of hydraulic piston and cylinder units, or through mechanical displacing arrangements such as rack and pinion units. Still further, a pin and slot arrangement such as that shown in FIGS. 13–15 for limiting displacement of the conveyor unit relative to the truck body could be provided between the channel members 154 of deck 150 and the truck body inwardly of openings 162 receiving the channel members. These and other modifications will be obvious to those skilled in the art from the disclosure herein. Accordingly, it is to be distinctly understood that the foregoing descriptive matter is to be interpreted merely as illustrative of the invention and not as a limitation.

Having thus described the invention, it is claimed:

1. In a dump body to be mounted on a truck, said body having front and rear ends and forming a receptacle having a bottom, a tailgate with a lower opening and pivotally mounted to swing on said body into a position closing said rear end, said body having a longitudinally extending endless conveyor for conveying material in said receptacle rearwardly for discharge through said opening, the improvement comprising: support means supporting said conveyor for displacement between retracted and extended positions relative to said dump body; and, said conveyor has a rear end including an integrated spreader mounted on said rear end of said conveyor for displacement therewith.

2. A dump body according to claim 1, wherein said bottom has an opening therethrough and said conveyor underlies said opening in said bottom.

3. A dump body according to claim 2, wherein said dump body includes a removable panel for covering said opening in said bottom.

4. A dump body according to claim 1, wherein said conveyor is removable from said dump body.

5. A dump body according to claim 1, wherein said spreader is removable from said conveyor.

6. A dump body according to claim 1, wherein said conveyor and said spreader are removable from said dump body as a unit.

7. A dump body according to claim 6, wherein said bottom has an opening therethrough and said conveyor underlies said opening in said bottom.

8. A dump body according to claim 7, wherein said dump body includes a removable panel for covering said opening in said bottom.

9. In a dump body to be mounted on a truck, said body having front and rear ends and forming a receptacle having a bottom, a tailgate with a lower opening and pivotally mounted to swing on said body into a position closing said rear end, said body having a longitudinally extending endless conveyor for conveying material in said receptacle rearwardly for discharge through said opening, the improvement comprising: support means supporting said conveyor for displacement between retracted and extended positions relative to said dump body, said support means and said conveyor have interengaging slot and pin means for limiting said displacement of said conveyor.

10. A dump body according to claim 9, wherein said support means includes a generally U-shaped support member extending longitudinally beneath said bottom and slidably supporting said conveyor.

11. A dump body according to claim 10, wherein said support member has side walls and said slot and pin means includes a pin between said side walls and a slot in said conveyor, said pin extending through said slots and slidably interengaging therewith for limiting said displacement of said conveyor.

12. A dump body according to claim 10, wherein said support member has side walls and said slot and pin means includes a slot through at least one of said side walls and a pin on said conveyor extending through said slot and slidably interengaging therewith for limiting said displacement of said conveyor.

13. A dump body according to claim 9, wherein said conveyor has a rear end including a rear deck extending laterally thereof, said rear deck including laterally spaced apart rail members and a cross member therebetween, said rear end of said dump body including laterally spaced apart openings, and said rail members slidingly engaging in said openings for maintaining said deck and said conveyor in a desired orientation relative to said dump body.

14. A dump body according to claim 13, wherein said support means includes at least one hydraulic piston and cylinder unit mounted between said rear deck and said dump body.

15. A dump body according to claim 14, wherein said bottom has an opening therethrough and said conveyor underlies said opening in said bottom.

16. A dump body according to claim 15, wherein said dump body includes a removable panel for covering said opening in said bottom.

17. A dump body according to claim 14, wherein said conveyor is removable from said dump body.

18. A dump body according to claim 17, wherein said conveyor has a rear end, and a spreader mounted on said rear end of said conveyor for displacement therewith.

19. A dump body according to claim 18, wherein said spreader is removable from said conveyor.

20. A dump body according to claim 18, wherein said conveyor and said spreader are removable from said dump body as a unit.

21. In a dump body to be mounted on a truck, said body having front and rear ends and forming a receptacle having a bottom, a tailgate with a lower opening and pivotally mounted to swing on said body into a position closing said rear end, said body having a longitudinally extending endless conveyor for conveying material in said receptacle rearwardly for discharge through said opening, the improvement comprising: support means supporting said conveyor for displacement between retracted and extended positions relative to said dump body, said support means includes a generally U-shaped support member beneath said bottom and slidably supporting said conveyor, said conveyor having a rear end including a rear deck extending laterally thereof, said rear deck including laterally spaced apart rail members and a cross member therebetween, said rear end of said dump body including laterally spaced apart openings, and said rail members slidingly engaging in said openings for maintaining said deck and said conveyor in a desired orientation relative to said dump body.

22. A dump body according to claim 21, wherein said support means includes at least one hydraulic piston and cylinder unit mounted between said rear deck and said dump body.

23. A dump body according to claim 22, wherein said bottom has an opening therethrough and said conveyor underlies said opening in said bottom.

24. A dump body according to claim 23, wherein said dump body includes a removable panel for covering said opening in said bottom.

25. A dump body according to claim 24, wherein said conveyor is removable from said dump body.

26. A dump body according to claim 25, wherein said conveyor has a rear end, and a spreader mounted on said rear end of said conveyor for displacement therewith.

27. A dump body according to claim 26, wherein said spreader is removable from said conveyor.

28. A dump body according to claim 26, wherein said conveyor and said spreader are removable from said dump body as a unit.

29. In a dump body to be mounted on a truck, said body having front and rear ends and forming a receptacle having a bottom, a tailgate with a lower opening and pivotally mounted to swing on said body into a position closing said rear end, said body having a longitudinally extending endless conveyor for conveying material in said receptacle rearwardly for discharge through said opening, the improvement comprising: support means supporting said conveyor for displacement between retracted and extended positions relative to said dump body, said conveyor has a rear end including a rear deck extending laterally thereof, said rear deck including laterally spaced apart rail members and a cross member therebetween, said rear end of said dump body including laterally spaced apart openings, and said rail members slidingly engaging in said openings for maintaining said deck and said conveyor in a desired orientation relative to said dump body.

30. A dump body according to claim 29, wherein said bottom has an opening therethrough and said conveyor underlies said opening in said bottom.

31. A dump body according to claim 30, wherein said dump body includes a removable panel for covering said opening in said bottom.

32. A dump body according to claim 31, wherein said conveyor is removable from said dump body.

33. A dump body according to claim 32, wherein said conveyor has a rear end, and a spreader mounted on said rear end of said conveyor for displacement therewith.

34. A dump body according to claim 33, wherein said spreader is removable from said conveyor.

35. A dump body according to claim 34, wherein said conveyor and said spreader are removable from said dump body as a unit.

36. A dump body to be mounted on a truck, said body having a bottom with an opening therethrough, side walls extending upward from said bottom, a front end and a rear end, a tailgate having an opening therethrough and pivotally mounted to swing on said body into a position closing said rear end, an endless conveyor below said bottom and underlying said opening therein, said conveyor extending longitudinally of said body and having a front end and a rear end, a spreader mounted on said rear end of said conveyor, said rear end of said conveyor and said spreader being rearwardly of said rear end of said dump body, and support means supporting said conveyor and said spreader for sliding displacement as a unit between extended and retracted positions relative to said dump body and for removal as a unit from said dump body.

37. A dump body according to claim 36, wherein said spreader is removable from said conveyor.

38. A dump body to be mounted on a truck, said body having a bottom with an opening therethrough, side walls extending upward from said bottom, a front end and a rear end, a tailgate having an opening therethrough and pivotally mounted to swing on said body into a position closing said rear end, an endless conveyor below said bottom and underlying said opening therein, said conveyor extending longitudinally of said body and having a front end and a rear end, a spreader mounted on said rear end of said conveyor, said rear end of said conveyor and said spreader being rearwardly of said rear end of said dump body, and support means supporting said conveyor and said spreader for sliding displacement as a unit between extended and retracted positions relative to said dump body and for removal as a unit from said dump body, said opening in said bottom of said dump body extends from a location rearward of said front end to said rear end.

39. A dump body according to claim 38, wherein said dump body includes a removable panel for covering said opening in said bottom.

40. A dump body to be mounted on a truck, said body having a bottom with an opening therethrough, side walls extending upward from said bottom, a front end and a rear end, a tailgate having an opening therethrough and pivotally mounted to swing on said body into a position closing said rear end, an endless conveyor below said bottom and underlying said opening therein, said conveyor extending longitudinally of said body and having a front end and a rear end, a spreader mounted on said rear end of said conveyor, said rear end of said conveyor and said spreader being rearwardly of said rear end of said dump body, and support means supporting said conveyor and said spreader for sliding displacement as a unit between extended and retracted positions relative to said dump body and for removal as a unit from said dump body, said support means and said conveyor have interengaging slot and pin means for limiting said displacement of said conveyor and spreader.

41. A dump body to be mounted on a truck, said body having a bottom with an opening therethrough, side walls extending upward from said bottom, a front end and a rear end, a tailgate having an opening therethrough and pivotally mounted to swing on said body into a position closing said rear end, an endless conveyor below said bottom and underlying said opening therein, said conveyor extending longitudinally of said body and having a front end and a rear end, a spreader mounted on said rear end of said conveyor, said rear end of said conveyor and said spreader being rearwardly of said rear end of said dump body, and support means supporting said conveyor and said spreader for sliding displacement as a unit between extended and retracted positions relative to said dump body and for removal as a unit from said dump body, said dump body includes a generally U-shaped support member extending longitudinally beneath said bottom and slidably supporting said conveyor.

42. A dump body according to claim 41, wherein said support member has side walls and said conveyor has support rails including slots therethrough, and a tubular pin extending through said slots and mounted between said side walls for interengaging with said slots to limit said sliding displacement of said conveyor.

43. A dump body according to claim 41, wherein said support member has side walls including slots therethrough, and said conveyor has support rails including pins thereon, said pins extending through said slots and interengaging therewith to limit said sliding displacement of said conveyor.

44. A dump body to be mounted on a truck, said body having a bottom with an opening therethrough, side walls extending upward from said bottom, a front end and a rear end, a tailgate having an opening therethrough and pivotally mounted to swing on said body into a position closing said rear end, an endless conveyor below said bottom and underlying said opening therein, said conveyor extending longitudinally of said body and having a front end and a rear end, a spreader mounted on said rear end of said conveyor, said rear end of said conveyor and said spreader being rearwardly of said rear end of said dump body, and support means supporting said conveyor and said spreader for sliding displacement as a unit between extended and retracted positions relative to said dump body and for removal as a unit from said dump body, said conveyor has a rear end including a rear deck extending laterally thereof, said rear deck includes laterally spaced apart channel members and a tubular cross member therebetween, said rear end of said dump body includes laterally spaced apart rear openings, said channel members slidingly engaged with said rear openings for maintaining said deck and said conveyor in desired orientation relative to said dump body.

45. A dump body according to claim 44, wherein said support means includes at least one hydraulic piston and cylinder unit mounted to said rear deck and said dump body.

46. A dump body according to claim 45, wherein said dump body includes a generally U-shaped support member extending longitudinally beneath said bottom and slidably supporting said conveyor.

47. A dump body according to claim 44, wherein said support means and said conveyor have interengaging slot and pin means for limiting said displacement of said conveyor and spreader.

48. A dump body according to claim 47, wherein said dump body includes a generally U-shaped support member extending longitudinally beneath said bottom and slidably supporting said conveyor.

49. A dump body according to claim 48, wherein said support member has side walls and said conveyor has support rails including slots therethrough, and a tubular pin extending through said slots and mounted between said side walls for interengaging with said slots to limit said sliding displacement of said conveyor.

50. A dump body according to claim 47, wherein said opening in said bottom of said dump body extends from a location rearward of said front end to said rear end.

51. A dump body according to claim 50, wherein said dump body includes a removable panel for covering said opening in said bottom.

52. A dump body according to claim 51, wherein said spreader is removable from said conveyor.

53. In a dump body to be mounted on a truck, said body having front and rear ends and forming a receptacle having a bottom, a tailgate with a lower opening and pivotally mounted to swing on said body into a position closing said rear end, said body having a longitudinally extending endless conveyor for conveying material in said receptacle rearwardly for discharge through said opening, the improvement comprising: a support mechanism supporting said conveyor for displacement between retracted and extended positions relative to said dump body; and, said support mechanism includes a generally U-shaped support member beneath said bottom and slidably supporting said conveyor.

54. A dump body according to claim 53, wherein said bottom has an opening therethrough and said conveyor underlies said opening in said bottom.

55. A dump body according to claim 54, wherein said dump body includes a removable panel for covering said opening in said bottom.

56. A dump body according to claim 55, wherein said conveyor is removable from said dump body.

57. A dump body according to claim 56, wherein said conveyor has a rear end, and a spreader mounted on said rear end of said conveyor for displacement therewith.

58. A dump body according to claim 57, wherein said spreader is removable from said conveyor.

59. A dump body according to claim 57, wherein said conveyor and said spreader are removable from said dump body as a unit.

* * * * *